US006596808B1

(12) United States Patent
Newberth, III et al.

(10) Patent No.: US 6,596,808 B1
(45) Date of Patent: Jul. 22, 2003

(54) STRUCTURAL ANAEROBIC ADHESIVE COMPOSITIONS WITH IMPROVED CURE SPEED AND STRENGTH

(75) Inventors: Frederick F. Newberth, III, West Hartford, CT (US); Paul J. Rachielles, Burlington, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 194 days.

(21) Appl. No.: 09/882,088

(22) Filed: Jun. 15, 2001

(51) Int. Cl.⁷ .................................................. C08F 2/00
(52) U.S. Cl. .................... 524/812; 524/832; 526/90; 526/227; 526/319
(58) Field of Search ................... 524/812, 832; 526/90, 227, 319

(56) References Cited

U.S. PATENT DOCUMENTS

| | | | |
|---|---|---|---|
| 3,041,322 A | 6/1962 | Krieble | 260/89.5 |
| 3,046,282 A | 7/1962 | Buckwalter | 260/314.5 |
| 3,203,941 A | 8/1965 | Krieble | 260/89.5 |
| 3,218,305 A | 11/1965 | Krieble | 260/89.5 |
| 4,287,330 A | 9/1981 | Rich | 526/270 |
| 4,321,349 A | 3/1982 | Rich | 526/270 |
| 4,539,049 A * | 9/1985 | Cohen | 106/287.17 |
| 4,916,184 A | 4/1990 | Clark | 525/27 |
| 5,656,703 A | 8/1997 | Costin et al. | 525/531 |

* cited by examiner

Primary Examiner—David W. Wu
Assistant Examiner—William Cheung
(74) Attorney, Agent, or Firm—Steven C. Bauman

(57) ABSTRACT

Anaerobic adhesive compositions, the reaction products of which demonstrate improved cure speed and bond strength are disclosed. A high percentage of ultimate bond strength is reached within the first hour of room temperature cure. Higher ultimate bond strengths as compared to conventional compositions are achieved. The anaerobic adhesive compositions incorporate an adhesion promoter which contributes to these properties.

7 Claims, 1 Drawing Sheet

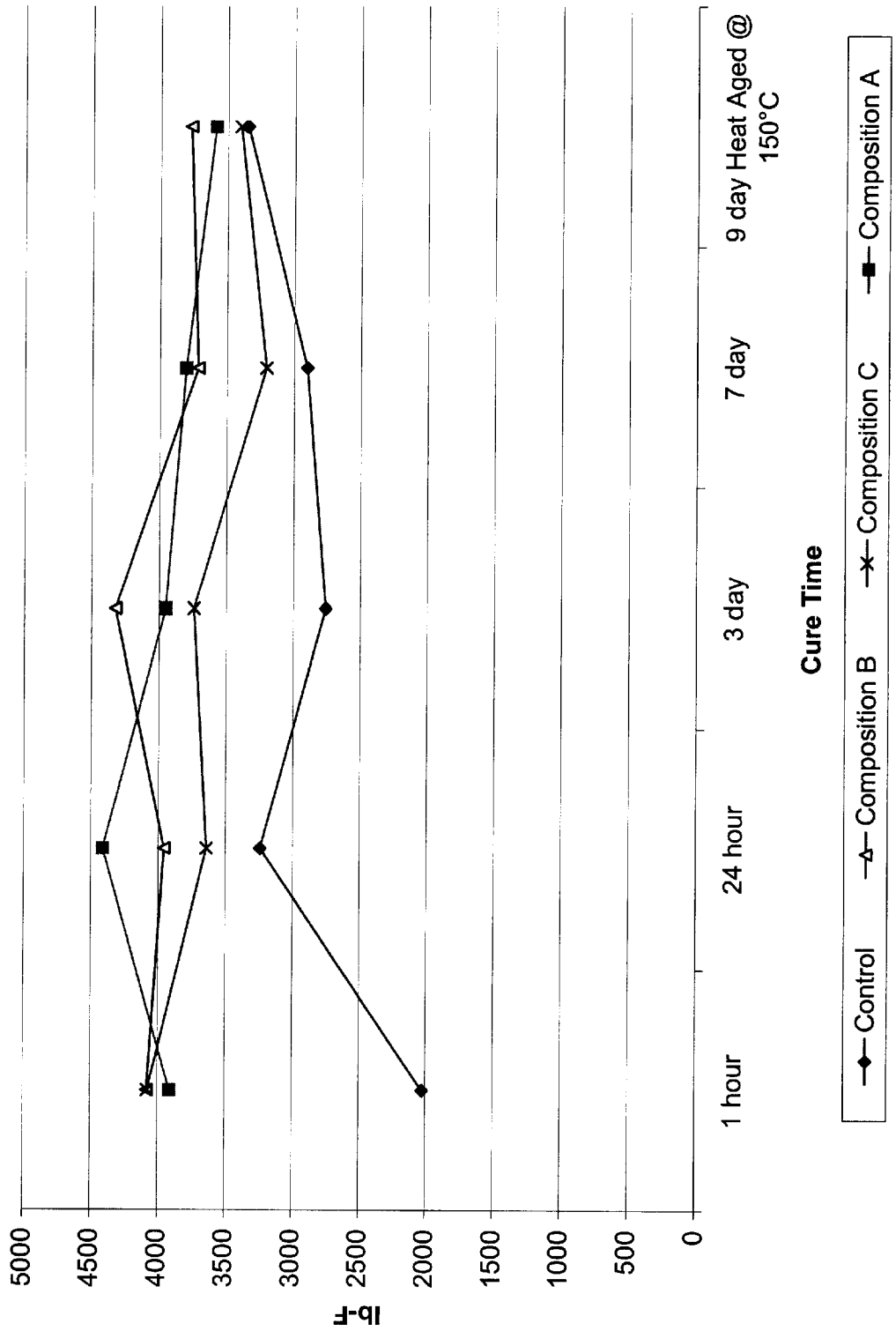

STRUCTURAL ANAEROBIC ADHESIVE COMPOSITIONS WITH IMPROVED CURE SPEED AND STRENGTH

FIELD OF THE INVENTION

This invention relates to anaerobic adhesive compositions, reaction products of which demonstrate enhanced cure speed and cure strength as compared to conventional anaerobic compositions. More particularly, the compositions of the present invention reach a high percentage of their final cure strength at room temperature cure in very short time periods, e.g., in about one hour or less.

BACKGROUND OF RELATED TECHNOLOGY

Structural anaerobic adhesives are used in a wide variety of applications. Typically, curable monomers used in these applications have been tailored to provide the strength and toughness required for the application at hand. In addition to adequate cure strength and toughness properties, resistance to chemicals and temperature extremes, and the ability to cure rapidly are also properties often desired. Structural anaerobic adhesives are used for a number of important applications in the automotive industry, where production line efficiencies are important.

Adhesive bonding strength, which is among the most important properties of structural adhesives, is often difficult to achieve on coated substrate surfaces frequently encountered with automotive parts. Among the surfaces on which it is particularly difficult to obtain rapid, high strength bonding are those which have been coated with cured adhesive, paint and various other finishes or surface preparations common to the automotive industry. These coatings often times prevent direct contact between the substrate and the applied adhesive, thereby interfering with the bond intended to be formed therebetween. For example, coating of paints and epoxies on metal parts is common in the automotive industry. In one particular application, motor housings are electrostatically coated with epoxy resins in the production process. Motor magnets are then bonded to the cured epoxy coating using structural anaerobic adhesives, which are then expected to demonstrate sufficient bond strength to withstand the useful life of the motor. Current anaerobic structural adhesives require about 24 hours or longer to reach significant cure strength. This time delay is costly from a production standpoint. Additionally, the final cure strengths of most commercial anaerobic structural adhesives, while adequate for many applications, leave room for improvement both in final cure strength and, as noted above, in the speed in which cure strength is reached.

Those persons of ordinary skill in the art acknowledge that peroxides serve as a free radical generating source which initiate free radical curing of the polymerizable anaerobic adhesive monomer compositions. To increase the speed at which the free radical is generated, accelerators are employed in combination with the peroxides to enhance the speed at which the peroxide free radical is generated. In so doing, the cure speed of the anaerobic adhesive composition is increased. As anaerobic adhesive compositions have evolved, various combinations of peroxides and accelerators have been used. Recently, such compositions have employed a plurality of compounds as accelerators to serve as reducing agents for the peroxide to increase cure speed.

One approach to achieving accelerated cure speeds is to add accelerators to the anaerobic adhesive compositions.

Various accelerator compounds, such as tertiary amines, imides, polyamines, cyclicamines and arylamines, have been successfully included in anaerobic adhesive compositions to further increase cure speeds and completion of cure. See, e.g., U.S. Pat. No. 3,041,322 (tertiaryamines), U.S. Pat. No. 3,046,282 (imides), U.S. Pat. No. 3,203,941 (polyamines), and U.S. Pat. No. 3,218,305 (cyclic and arylamines), all to Kriebel. These accelerators were generally used in amounts of about 0.05 up to about 20%, depending on the type of amine and amount of peroxide present in the anaerobic adhesive composition. While the use of accelerators tends to increase cure speed, it is believed to have little effect on increasing the ultimate bond strength.

U.S. Pat. Nos. 4,287,330 and 4,321,349 to Rich disclose anaerobic adhesive compositions which include a hydrazine accelerator, along with peroxides and amines in amounts previously referred to herein, to increase the cure speed of the anaerobic curing monomer. The hydrazines are disclosed as being useful in amounts of about 0.1–5% by weight.

Anaerobic adhesive compositions have also conventionally been used with primer compositions to speed their cure. On substrates such as stainless steel, zinc, dichromate, and cadmium, which are considered "slow" or relatively inactive materials for anaerobic cure, primer compositions have been considered necessary for quick fixture and cure times required of many applications.

The use of primer compositions requires an additional step prior to applying the anaerobic adhesive composition, which is often inconvenient and costly. Often the solvent used to carry the accelerator component in the primer is environmentally harmful and requires special handling and disposal. Moreover, ordinarily the user must wait until the solvent has evaporated before applying the adhesive.

Adhesion promoters have also been added to anaerobic adhesive compositions to improve adhesion. Typically, silanes have been used to modify the surface chemistry of filler materials. Cure speed is not usually affected by the use of silanes and increased bond strength, as opposed to better adhesion, does not always occur. Silanes often require heat to react with fillers and have handling problems due to rapid hydrolysis and polymerization in the presence of moisture.

U.S. Pat. No. 4,539,049 discloses aluminum zirconium metallo-organic complexes which are used as coupling agents. These complexes are used to modify the surfaces of particulates and fibers which are then added to resin materials to enhance physical properties. No express disclosure of specific resin materials is provided, nor is bond strength or acceleration of cure mentioned.

U.S. Pat. No. 5,656,703 to Costin et al. discloses using a metal di(meth)acrylate and a polyamine in a curable coating composition to obtain improved adhesion. No mention of cure speed, acceleration of completeness of cure or higher bond strength is made.

U.S. Pat. No. 4,916,184 to Clark discloses the use of specific initiator compounds, such as t-butyl peroxy maleic acid to achieve increased bond strengths of ethylenically unsaturated adhesive compositions. No mention of cure speed or rapid completeness of cure is made.

Chartwell International, Inc., Littleborough, Mass., markets a series of adhesion promoters under the trademark CHARTWELL. One particular adhesion promoter sold by this company, Chartwell B-545.1, is described by their publicly available data sheet (5/00) as being useful in conjunction with "acrylate (meth)acrylate adhesives and sealants for improved adhesion to metals, concrete, wood and many plastics (oxygen containing polymers only) and ceramics. No disclosure or suggestion as to speed of cure, obtaining increased bond strength or reaching a greater percent of ultimate bond strength in the first hour is made.

Thus, although a variety of accelerator compositions and adhesion promoters have been employed to increase the cure speed of anaerobic adhesive compositions, achieving ultimate bond strengths in rapid time periods employing such accelerators have not been entirely successful.

It would be therefore desirable, to provide anaerobic compositions which provide high bond strength in an extremely rapid fashion, which readily reach a high percent of their ultimate bond strength and which bond well to surfaces, such as finished metal surfaces and plastics, to which bonding is traditionally difficult. The present invention provides compositions which achieve these and other advantages to be further disclosed herein.

BRIEF DESCRIPTION OF THE DRAWING

The FIGURE graphically shows the test results of bond strengths of the inventive anaerobic adhesive compositions as compared to a control anaerobic adhesive composition.

SUMMARY OF THE INVENTION

The present invention provides anaerobic adhesive compositions and their reaction products which reach high strength in a rapid time frame. In particular, these compositions are capable of reaching close to their ultimate cure strength within the first few hours, and more desirably in the first hour, of room temperature cure. In addition to curable components, the inventive compositions include an organometallic adhesion promoter which when added in appropriate amounts, surprisingly not only increases the ultimate cure strength, but also greatly accelerates achieving ultimate cure strength in the first hour, whereas conventional anaerobic compositions required at least about 24 hours to attain full bond strength. The composition of the present invention reach a more complete cure more rapidly and with higher bond strength. After the first 24 hours of room temperature cure, the inventive compositions may still achieve increases in bond strength, i.e., about 10% increase.

In one aspect of the present invention, there are provided an anaerobic adhesive compositions, reaction products of which demonstrate bond strengths of at least about 75% of their 24 hour room temperature bond strength within the first hour of room temperature cure, which includes: (a) an anaerobically curable (meth)acrylate monomer; (b) a cure system for (meth)acrylate monomer, and (c) an adhesion promoter additive having the formula HO—[M]—R, wherein M includes a metal or bimetal complex and R includes a methacryl group.

In another aspect of the present invention, there are provided anaerobic adhesive compositions which include reaction products of: (a) an anaerobically curable (meth) acrylate monomer; (b) a cure system for the (meth)acrylate monomer; and (c) an adhesion promoter additive having the formula HO—[M]—R, wherein M includes a metal or bimetal complex and R includes a methacryl group, and wherein the bond strength after one hour room temperature cure is about twice the strength as compared to the bond strength of components a.) and b.) in the absence of component c.).

In still another aspect of the present invention, there are provided methods of accelerating and increasing the ultimate cure strength of an anaerobic adhesive composition which include the step of adding to an anaerobic adhesive composition an additive having the formula OH—[M]—R, wherein M is a metal or bimetal complex and R includes a methacryl group, desirably the additive is present in components sufficient to achieve the intended increase in cure speed and ultimate cure strength, without causing instability of the total composition. One useful range of the additive is from about 0.5 to about 1.5% by weight of the total composition.

In yet another aspect of the present invention, there are provided methods of preparing an anaerobic adhesive composition having increased cure speed and cure strength which includes the steps of combining in admixture: (a) an anaerobically curable (meth)acrylate monomer; (b) a cure system for said (meth)acrylate monomer; and (c) an organometallo adhesion promoter additive having the formula HO—[M]—R, wherein M includes a metal or bimetal complex and R includes a methacryl group.

In a further aspect of the present invention, there are provided structural adhesive compositions, reaction products of which demonstrate bond strengths of at least about 75% their 24 hour room temperature bond strength within the first hour of room temperature cure, particularly on polymeric surfaces, which includes: (a) an anaerobically curable (meth)acrylate monomer; (b) a cure system for said (meth)acrylate monomer; and (c) an adhesion promoter additive having the formula HO—[M]—R, wherein M includes a metal or bimetal complex and R includes a methacryl group.

DETAILED DESCRIPTION OF THE INVENTION

Curable polyolefinically unsaturated monomers may be used as the polymerizable, crosslinkable resin component including acrylic and methacrylic resins, and mixtures thereof. The term (meth)acrylic is used to refer to both types of resins.

Useful anaerobic curing monomers include the alkylene glycol diacrylates having the general formula:

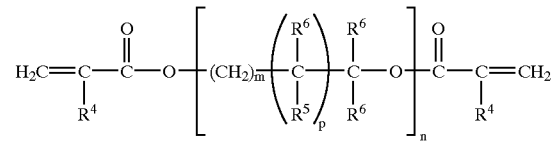

wherein $R^4$ is selected from the group consisting of hydrogen, halogen, and lower alkyl of 1–4 carbon atoms; $R^5$ is selected from the group consisting of hydrogen, —OH and

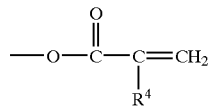

$R^6$ is a radical selected from the group consisting of hydrogen, lower alkyl of 1–4 carbon atoms, hydroxyalkyl of 1–4 carbon atoms, and m is an integer equal to at least 1, desirably 1–8 and more desirably from 1 to 4; n is an integer equal to at least 1, desirably, 1 to 20; and p is 0 or 1.

Typical of these monomers are mono-, di-, tri- tetra- and polyethylene glycol dimethacrylate and the corresponding diacrylates; di(pentamethylene glycol)dimethacrylate; tetraethylene glycol di(chloroacrylate); diglycerol diacrylate; diglycerol tetramethacrylate; butylene glycol dimethacrylate; neopentyl glycol diacrylate; and trimethylopropane triacrylate.

Particularly useful polymerizable crosslinkable components are ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopertyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate and combinations thereof.

Various useful urethane-acrylate type monomers, such as those described in U.S. Pat. No. 3,925,988 to Gorman, and U.S. Pat. No. 4,309,526 to Baccei, each of which are incorporated herein by reference may be used. The monomers disclosed in the '526 patent may be viewed as one-component polymerizable block copolymers (prepolymers) having rigid and flexible segments. This is achieved by the chemical linking of precursor "prepolymers" which are subsequently "capped" with (meth)acrylate, functionality.

Additional urethane-acrylate-capped prepolymers based on polybutadiene polyols or polyamines as disclosed in U.S. Pat. No. 4,295,909, also to Baccei, are also useful. This patent is also incorporated herein by reference. The polybutadiene introduce a flexibility into the cured product which results in improved thermal, impact and cure-through gap properties. The ipolybutadiene and polyamine reactants used to form the cured product comprise about 5–150 butadiene units and have at least about 70% of the butadiene units in the 1,4-configuration. These reactants are reacted with either a molar excess of a reaction product of a polyisocyanate with a polyol or just with a polyisocyanate. The product of this reaction is then capped with a hydroxyalkyl (meth)acrylate.

Other useful monomers include those acrylates derived from bisphenol-A, such as bisphenol-A dimethacrylate, hydrogenated bisphenol-A dimethacrylate, and ethoxylated bisphenol-A dimethacrylate.

While di- and other polyacrylate esters have been found particularly desirable, monofunctional acrylate esters (esters containing one acrylate group) also may be used. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The materials are often incorporated as reactive diluents which are capable of copolymerizing with the various other polymerizable materials.

Useful ranges of (meth)acrylate monomer components is desirably about 30% to 95% by weight, more desirably about 40% to about 80% by weight, and most desirably about 45 to about 50% by weight.

Other unsaturated reactive diluents, such as styrene and acrylonitrile, can also be used. When used, the concentration of such diluents should be less than about 60 percent by weight, such as about 10 to about 40 percent by weight of the composition, based on the total weight of the composition.

Reactive and non-reactive elastomeric or rubber components may also be incorporated. For example butadiene-styrene block copolymers, such as those sold under the trademark STEREON, sold by Firestone Corporation, Akron, Ohio, have been found to be useful.

Other toughening components may be chosen from a wide variety of elastomeric materials which form discrete particles or biphasic domains in the cured composition. For example, prereacted particles of polyacrylate, styrene/butadiene/styrene (SBS) copolymers, styrene/isoprene/styrene (SIS) copolymers, styrene/butadiene (SBR) copolymers, as well as other prereacted materials may be added in particulate form to the composition. A partial listing of useful prereacted elastomer rubbers includes prereacted elastomer particles selected from the group consisting of acrylate-butadiene, butadiene, chloroprene, ethylene-propylene, ethylene-propylene-diene, isoprene, isobutylene, isobutylene-isoprene (butyl rubber), styrene-butadiene, styrene-isoprene, acrylonitrile-butadiene, acrylonitrile-chloroprene, vinylpyridine-butadiene, vinylpyridine-styrene-butadiene, carboxylic-styrene-butadiene, chloroisobutylene-isoprene (chlorobutyl rubber), bromoisobutylene-isoprene (bromobutyl rubber), dialkysiloxane, poly(propylene oxide), polyesterurethanes, polyetherurethanes, and mixtures thereof. Reactive liquid polymers (RLP's) can be also incorporated as the toughening component. RLP's contain functional groups, usually on their terminal ends but occasionally as pendant groups, and react with the epoxy resin in situ to form elastomeric domains. Examples of RLP's include, without limitation, carboxy-terminated butadiene nitrile (CTBN), amine-terminated butadiene nitrile (ATBN), hydroxy-terminated butadiene nitrile (HTBN), epoxy-terminated butadiene nitrile (ETBN), mercapto-terminated butadiene nitrile (MTPN) and phenoxy-terminated butadiene nitrile (PTBN).

A number of well known initiators of free radical polymerization may be incorporated in the present invention. Among those include, without limitation, hydroperoxides, such as cumene hydroperoxide (CHP), paramenthane hydroperoxide, tertiary butyl hydroperoxide (TBH) and tertiary butyl perbenzoate. While the useful amounts of peroxide compounds typically range from about 0.1 to about 10% by weight of the total composition, the present invention desirably uses about 1 to about 3% by weight.

Among the useful adhesion promoter additives which may be directly incorporated into the present anaerobic adhesive compositions are those described in U.S. Pat. No. 4,539,049, to Cohen, which is incorporated herein by reference. These additives are the complex reaction products of (I) chelate-stabilized aluminum compositions, (such as chelate stabilized aluminum chlorohydrates), (II) zirconium oxyhalide (such as oxychloride), and (III) carboxylic acids. The reactants utilized to obtain the compositions of the present Invention can generally be represented by the empirical formulas (I), (II), and (III):

$$Al_2(OR_1O)_aA_bB_c \qquad (I)$$

$$ZrA_dB_e \qquad (II)$$

$$\underset{HO-C=O}{\overset{R_2}{|}} \qquad (III)$$

wherein: A and B may be halogen, desirably chlorine, hydroxy. Desirably A and B are chloro or hydroxy, a is a numerical value ranging from about 0.05 to 2, desirably 0.1 to 1, b is a number ranging from about 0.05 to 5.5, preferably about 1 to 5; and c is a number ranging from 0.05 to 5.5, preferably about 1 to 5, provided that 2a+b+c=6 in the chelate stabilized aluminum reactant. Most preferably A is hydroxy and b ranges from 2 to 5, and B is chlorine and ranges from 1 to 3.8. The variables d and e have a numerical value from 0.05 to 4, provided that d+e=4 in the zirconium oxyhalide metallo-organic complex reactant. Preferably there is at least one hydroxy group and one halogen group in the zirconium reactant. More preferably the empirical ratio of hydroxy to the zirconium in this group is from about 1–2, and the ratio of halogen to zirconium is about 2–3, in that reactant.

In the aluminum containing segment of Formula I, pairs of aluminum atoms are joined by bidentate chelating ligands wherein:

(I) —OR$_1$O— is an alpha, beta or alpha, gamma glycol in which R$_1$ is an alkyl, alkenyl, alkynyl, or aralkyl group having from 1 to 6 carbon atoms, most preferably 2 or 3 carbon atoms, such ligands to be used exclusively or in combinations with a given compositions, or (2) —OR$_1$O— is an alpha-hydroxy carboxylic acid

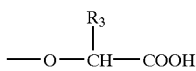

having from 2 to 6 carbon atoms, preferably 2 to 3 carbon atoms (i.e. preferably R$_3$ is H or CH$_3$). In each instance the organic ligand is bound to two aluminum atoms through two oxygen heteroatoms.

The organofunctional ligand —(OC(R$_2$)O— is a moiety which can be derived from one of, or a combination of, the following groups:

(1) An alkyl, alkenyl, alkynyl, aryl or aralkyl carboxylic acid having from 2 to 36 carbon atoms, the preferred range being 4 to 18 carbon atoms;

(2) an aminofunctional carboxylic acid having from 2 to 36 carbon atoms, the preferred range being 4 to 18 carbon atoms;

(3) a dibasic carboxylic acid having from 2 to 18 carbon atoms wherein both carboxy groups are preferably terminal, or preferred range being 2 to 6 carbon atoms, or;

(4) acid anhydrides of dibasic acids having from 2 to 18 carbon atoms, the preferred range being 2 to 6 carbon atoms;

(5) a mercapto functional carboxylic acid having from 2 to 18 carbon atoms, the preferred range being 2 to 6 carbon atoms;

(6) an epoxy functional carboxylic acid having from 2 to 18 carbon atoms, preferably from 2 to 6 carbon atoms.

An extensive variety of —OC(R$_2$)— anionic ligands is useful in the preparation of the subject compositions. Examples of specific dibasic acids include the anions of oxalic, malonic, succinic, glutonic, adipic, tartaric, itaconic, maleic, fumaric, phthalic and terephthalic. Example of fatty acids, include myristic, palmitic, stearic, oleic, linoleic and linolenic acids. In some compositions, in accordance with the present invention, the hydrophobicity imparted by the fatty acids provides a preferred material.

Examples of specific aminofunctional carboxylate anions, —OC(R$_2$)O— include the anions of glycine, alanine, beta-alanine, valine, leucine, isoleucine, phenylalanine, tyrosine, serine, threonine, methionine, cysteine, cystine, hydroxyproline, aspartic, and glutaric acids.

Examples of specific monobasic carboxylate anions, —OC(R$_2$)O— include the anions of acetic, propionic, butyric, pentanoic, hexanoic, heptanoic, octanoic, dodacanoic, myristic, palmitic, stearic, isostearic, propenoic, 2-methylphropenoic, butenoic, hexenoic, benzoic and cinnammic acids.

Examples of the anhydrides of dibasic acids include phthalic, isophthalic and terephthalic anhydrides.

Examples of chelating ligand (—OR$_1$O—) include: ethylene glycol, propylene glycol, glycerol, etc. Examples of alpha-hydroxy acids R$_3$'CH(OH)COO— are glycolic, lactic, alpha-hydroxybutyric, and tartaric acids and those known in the art.

The adhesive promoter reaction product involve the chelated aluminum moiety bridged to the ziroconium oxychloride moiety through the organofunctional ligand. This may be empirically represented by formula IV:

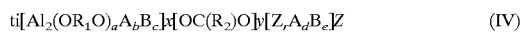

wherein A and B are as defined above, and a, b, c, d and e are as defined above, exept that, in order to form the bonds depicted, the substituents attached to the metal groups are appropriately reduced, i.e. 2a+b+c=4 (2a+b+c=5 when the aluminum moiety is a terminal group), and d+e=2 (d+e=3 when zirconium moiety is a terminal group). When the aluminum moiety or the zirconium moiety forms the terminus in the molecular chain, one of the A or B groups may be replaced by a lower alkoxy group having 1 to 6 carbon atoms.

X, Y and Z are at least each 1, and may vary from 1 to 100 or more, depending on the reactivity of the particular materials and the desired form of the product. The molar ratio of aluminum moiety to zirconium moiety (X to Z) may vary from about 1.5 to 10, with the preferred ratio being from about 3 to 6. The ratio of organofunctional ligand to total metal (Y/(2X+Z)) may vary from about 0.05 to 2.0, with preferred ratio being about 0.1 to 1.0.

Preparation of the aforementioned adhesion promoter additives may be practiced in accordance with the teachings of the '632 patent.

One particular useful adhesive promoter additive which has been discovered in the present invention to greatly accelerate cure speed, as well as cure strength, is sold under the trademark Charwell 545.1, by Chartwell International, Inc., Attleboro, Mass. This additive is described by company literature as having the general structure HO—[M]CH2)$_n$ (R), wherein M is a metal or bimetal complex and R is a reactive functional group, such as a methacryl, methacrylato group or carboxylato group. R may also be derived from one of the aforementioned organo functional liquids. M may be defined as the aluium/zirconium complex as defined above, and n may be 2 to 36.

The adhesive promoter additives of the present invention are usually prepared and carried in a glycol solvent, and desirably ethylene glycol.

The adhesive promoter additives of the present invention are added directly to the adhesive composition and used need not be coupled to a filler component prior to admixture with other adhesive components. Amounts of about 0.5 to about 1.5% have found to be useful in attaining nearly full cure and higher bond strength in very short times particularly while retaining stability of the adhesive composition. Amounts in excess of this range, for example 2.0% may be used but generally require inhibitors to prevent premature polymerization or other signs of instability. Addition of the additive to anaerobic adhesive compositions not only increased ultimate bond strength, in some instances to twice the value of the control composition, these bond strength values were achieved within a one hour room temperature cure. At least greater than 75% of the ultimate bond strength, and up to 88% of the ultimate bond strength has been achieved within the first hour of cure.

Useful accelerators for the present invention include compounds having the following formula:

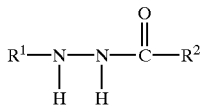

wherein $R^1$ is selected from alkyl from 2 to 6 carbon atoms, cycloalkyl, aryl, alkenyl, and cycloalkenyl and $R^2$ is selected from hydrogen, alkyl, cycloalkyl, alkenyl and cycloalkenyl, aryl, alkoxy, aryloxy, carbonyl, amino, and the following groups:

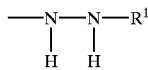

and

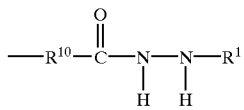

wherein $R^{10}$ is selected from alkyl groups containing one to about 10 carbon atoms, alkenyl groups containing two to about 10 carbon atoms, and aryl groups containing up to about 10 carbon atoms. Examples of useful accelerator compounds include 1-acetyl-2-phenyl hydrazine, 1-acetyl-2(p-tolyl) para-toluene sulfonyl hydrazide, 1-formyl-2-phenyl hydrazine and combinations thereof. As previously noted, the ratio of peroxide to accelerator is desirably about 2:1. While the amount of accelerator can be proportionately varied to the amount of peroxide present, the accelerator is desirably present in about 0.5% by weight of the total composition.

Stabilizers and inhibitors may also be employed as well as chelating agents to control and prevent premature peroxide decomposition and polymerization. Among those useful inhibitors include phenols such as hydroquinone and quinones. Chelating agents may be used to remove trace amounts of metal contaminants. An example of a useful chelating agent is the tetrasodium salt of ethylenediamine tetraacetic acid (EDTA).

Other agents such as thickeners, plasticizers, fillers, elastomers, thermoplastics, and other well-known additives may be incorporated where functionally desirable. Bismaleimides may also be incorporated for increased temperature resistance.

BRIEF DESCRIPTIONS OF THE DRAWINGS

The lb-F vs. Cure Time Chart briefly shows the adhesive bonding of magnets to electrostatically applied epoxy coating on steel.

EXAMPLES

Inventive compositions A–D were prepared in accordance with the present invention and are set forth in the tables below. These compositions are substantially identical to the Control composition, but for the addition of the adhesive promoter additive.

Example I

Control Composition Loctite Structural Adhesive 334

| COMPONENT | CAS NO. | WT. % |
|---|---|---|
| Aromatic methacrylate ester | 2495-37-6 | 30–80 |
| Hydrocarbon synthetic rubber | 9003-55-08 | 10–30 |
| Methacrylic acid | 79-41-4 | 5–20 |
| Maleimide resin | 3006-93-7 | 0–10 |
| tert-Butyl peroxybenzoate | 614-45-9 | 1–3 |
| Dimethacrylate ester | 1189-08-8 | 1–3 |
| Silica, amorphous, fumed, crystalline-free | 112945-52-5 | 1–3 |
| Saccharin | 81-07-2 | 0.1–1 |
| Adhesion promoter additive[1] | — | 0.5–1.5 |

[1]Chartwell 545.1 adhesion promoter

Inventive Compositions

| | COMPOSITION | | | |
|---|---|---|---|---|
| COMPONENT | A | B | C | D |
| Benzyl Methacrylate | 43.10 | 42.85 | 43.35 | 43.50 |
| Antioxidant | 0.05 | 0.05 | 0.05 | 0.05 |
| 1,3 Butyleneglycol Dimethacrylate | 1.90 | 1.90 | 1.90 | 1.90 |
| Chelator | 0.10 | 0.10 | 0.10 | 0.10 |
| But-Styr-Butadiene Copolymer | 29.00 | 29.00 | 29.00 | 29.0 |
| Methacrylic Acid | 11.40 | 11.20 | 11.20 | 11.20 |
| Saccharin | 0.15 | 0.60 | 0.60 | 0.15 |
| Silica, amorphous, fumed, crystalline-free | 1.40 | 1.40 | 1.40 | 1.40 |
| N,N-Phenylene Bismaleimide | 9.10 | 9.10 | 9.10 | 9.10 |
| Adhesion Promoter Additive[1] | 1.00 | 1.00 | 0.50 | 0.50 |
| t-Butyl Perbenzoate | 2.80 | 2.80 | 2.80 | 2.80 |
| | 100.00 | 100.00 | 100.00 | 100.00 |

Each of inventive compositions A, B and C were used to bond motor magnets to an electrostatically epoxy-coated motor housing used in automobiles. The bonding surface of the motor magnets all had the same adhesive area and substantially the same amount of the structural adhesives were applied to the magnets and bonded to the epoxy-coated housings, which had been primed using a conventional aldehyde-aniline condensate composition containing organo copper compound. A standard test used in the automotive industry was then conducted to determine the pounds of force required to break the bond, causing the motor magnet to break off the housing. A test fixture was made having an open cylinder designed to hold the motor housing having the magnet bonded thereto. The movement arm of an Instron testing machine was modified to extend into the motor housing against the magnet at approximately a normal angle. The arm was then advanced against the magnet at a constant rate of about 0.5 inches per minute until the magnet broke off the housing, either through adhesive failure, cohesive failure or both. The final break force was recorded.

The same test was also run on the control composition and the results of the tests are plotted graphically in the Figure. As is evident from the graph, each of the inventive compositions A, B and C exhibited approximately twice the adhesive strength after one hour of room temperature cure as compared to the control composition. Additional testing was performed at 24 hours, three days and seven days at room temperature. Additionally, tests were conducted after aging the assemblies for nine days at 150° C. During each of the first four test intervals, the inventive structural anaerobic adhesive compositions exhibited substantially improved cure strength, in addition to achieving nearly final cure strength within the first one hour of room temperature cure.

Lap shear tests were also conducted on inventive compositions A and C and compared to the above mentioned Control composition. These tests were conducted using steel to steel one inch lap shears with both 0 mil gaps as well as 5 mil gaps for the bond-line. Lap shears were pulled using standard test methods, i.e., ASTM 700 at one hour, 24 hours and 72 hours of room temperature cure.

Additionally, steel to electrostatically epoxy-coated lap shears were also bonded together using the structural anaerobic adhesive compositions at 0 mil gap and 5 mil gap bond-line.

The results of these tests, measured in pounds per square inch (PSI) required to break the lap shear are tabulated below at a 0 mil bond-line, steel to steel lap shears using inventive compositions showed adhesive strengths of 2069 and 1775 for the inventive compositions as compared to 1495 (Control) after one hour room temperature cure. After a 24 hour room temperature cure, the inventive composition showed 3044 and 2573 bond strengths, as compared to the control which demonstrated 2763 PSI. Since many structural adhesive applications often require the ability to remain structurally sound at thick bond-lines, the same tests were run using a 5 mil gap bond-line. Similar results for the inventive compositions as compared to the control, were also demonstrated for this increase in bond-line thickness.

Lap shear tests which use one steel and one electrostatically coated epoxy lap shear were also conducted, since different substrate surfaces such as these are typically encountered in commercial applications, and particularly in the automotive industry. The results at a bond-line of 0 mil and 5 mil clearly show the achievement of a rapid, high strength bond forming within the first hour of room temperature cure as compared to the Control. The ability to reach a substantially higher bond strength within the first hour of cure is clearly demonstrated in these lap shear tests.

|  | Control | Composition C | Composition A |
|---|---|---|---|
| Steel to Steel/0 mil gap | | | |
| 1 Hour RTC | 1495 | 2069 | 1775 |
| 24 Hour RTC | 2763 | 3044 | 2573 |
| 72 Hour RTC | 2515 | 2636 | 2358 |
| Steel to Steel/5 mil gap | | | |
| 1 Hour RTC | 1047 | 1852 | 1848 |
| 24 Hour RTC | 2013 | 2547 | 2256 |
| 72 Hour RTC | 2160 | 2391 | 2261 |
| Steel to E-Coat/0 mil gap | | | |
| 1 Hour RTC | 926 | 1404 | 894 |
| 24 Hour RTC | 2438 | 2373 | 1701 |
| 72 Hour RTC | 1525 | 2395 | 1849 |
| Steel to E-Coat/5 mil gap | | | |
| 1 Hour RTC | 634 | 1370 | 872 |
| 24 Hour RTC | 1757 | 2626 | 1880 |
| 72 Hour RTC | 1534 | 2229 | 1116 |

It was also discovered during the course of these experiments that the combination of adhesion promoter additive and saccharin produced more consistent bond strength results, i.e., less of a spread in the test data. The compositions which contained higher amounts of saccharin in combination with the adhesion promoter additive particularly exhibited this result.

Example II

The following anaerobic structural adhesive compositions are prepared in accordance with the present invention. Each of compositions E-L are representative of commercially available products which are modified using the adhesion promoter additive in accordance with the present invention.

Composition E

| COMPONENT | CAS NO. | WT. % |
|---|---|---|
| Polyurethane methacrylate resin | Proprietary | 50–55 |
| Hydroxyalkyl methacrylate | 27813-02-1 | 35–40 |
| Acrylic acid | 79-10-7 | 5–10 |
| Cumene hydroperoxide | 80-15-9 | 1–3 |
| Substituted silane | 2530-85-0 | 0.1–1 |
| Tributylamine | 102-82-9 | 0.1–1 |
| Adhesion promoter additive[1] | — | 0.5–1.5 |

[1]Chartwell 545.1 adhesion promoter

Composition F

| COMPONENT | CAS NO. | WT. % |
|---|---|---|
| Polyurethane methacrylate resin | Proprietary | 50–55 |
| Hydroxyalkyl methacrylate | 868-77-9 | 25–30 |
| High boiling methacrylate | 7534-94-3 | 15–20 |
| tert-Butyl peroxybenzoate | 614-45-9 | 3–5 |
| Acrylate acid | 79-10-7 | 1–3 |
| Saccharin | 81-07-2 | 1–3 |
| Adhesion promoter additive[1] | — | 0.5–1.5 |

[1]Chartwell 545.1 adhesion promoter

Composition G

| COMPONENT | CAS NO. | WT. % |
|---|---|---|
| Polyurethane methacrylate resin | Proprietary | 50–55 |
| Polyglycol dimethacrylate | 109-16-0 | 25–30 |
| Hydroxyalkyl methacrylate | 27813-02-1 | 10–15 |
| Acrylic acid | 79-10-7 | 3–5 |
| tert-Butyl peroxybenzoate | 614-45-9 | 1–3 |
| Cumene hydroperoxide | 80-15-9 | 1–3 |
| Saccharin | 81-07-2 | 0.1–1 |
| Substituted silane | 2530-85-0 | 0.1–1 |
| Adhesion promoter additive[1] | — | 0.5–1.5 |

[1]Chartwell 545.1 adhesion promoter

Composition H

| COMPONENT | CAS NO. | WT % |
|---|---|---|
| Heterocyclic methacrylate | 2455-24-5 | 50–55 |
| Polyethylene based rubber | 68037-39-8 | 30–35 |
| Alkyl methacrylate | 688-84-6 | 5–10 |
| Methacrylic acid | 79-41-4 | 5–10 |

-continued

| COMPONENT | CAS NO. | WT % |
|---|---|---|
| Cumene hydroperoxide | 80-15-9 | 0.1–1 |
| 2,6-di-tert-butyl-p-cresol | 128-37-0 | 0.1–1 |
| Epoxy resin | 25068-38-6 | 0.1–1 |
| Carbon tetrachloride | 56-23-5 | 0.01–0.1 |
| Adhesion promotor additive[1] | — | 0.5–1.5 |

[1]Chartwell 545.1 adhesion promoter

Composition I

| COMPONENT | CAS NO. | WT % |
|---|---|---|
| Polyurethane methacrylate resin | Proprietary | 35–40 |
| High boiling acrylate | 5888-33-5 | 20–25 |
| Hydroxyalkyl methacrylate | 868-77-9 | 20–25 |
| Methacrylic acid | 79-41-4 | 5–7 |
| Modified silicon dioxide | 67762-90-7 | 5–7 |
| Tert-Butyl peroxybenzoate | 614-45-9 | 3–5 |
| Maleic acid | 110-16-7 | 1–3 |
| Saccharin | 81-07-2 | 1–3 |
| Adhesion promoter additive[1] | — | 0.5–1.5 |

[1]Chartwell 545.1 adhesion promoter

Composition J

| COMPONENT | CAS NO. | WT % |
|---|---|---|
| Polyurethane methacrylate resin | Proprietary | 45–50 |
| Hydroxyalkyl methacrylate | 868-77-9 | 35–40 |
| High boiling methacrylate | 7534-94-3 | 10–15 |
| Acrylic acid | 79-10-7 | 1–3 |
| Cumene hydroperoxide | 80-15-9 | 1–3 |
| 1-Acetyl-2-Phenylhydrazine | 114-83-0 | 0.1–1 |
| Saccharin | 81-07-2 | 0.1–1 |
| Adhesion promoter additive[1] | — | 0.5–1.5 |

[1]Chartwell 545.1 adhesion promoter

Composition K

| COMPONENT | CAS NO. | WT % |
|---|---|---|
| Polyurethane Methacrylate Resin | Proprietary | 35–40 |
| High Boiling Acrylate | 5888-33-5 | 20–25 |
| Hydroxyalkyl Methacrylate | 868-77-9 | 20–25 |
| Tert-Butyl Peroxybenzoate | 614-45-9 | 3–5 |
| Modified Silicon Dioxide | 67762-90-7 | 3–5 |
| Maleic Acid | 110-16-7 | 1–3 |
| Photoinitiator | 947-19-3 | 1–3 |
| Saccharin | 81-07-2 | 1–3 |
| Adhesion Promoter Additive[1] | — | 0.5–1.5 |

[1]Chartwell 545.1 adhesion promoter

Composition L

| COMPONENT | CAS NO. | WEIGHT % |
|---|---|---|
| Polyurethane Methacrylate | Proprietary | 40–45 |
| Hydroxyalkyl Methacrylate | 868-77-9 | 35–40 |
| High Boiling Methacrylate | 7534-94-3 | 10–15 |

-continued

| COMPONENT | CAS NO. | WEIGHT % |
|---|---|---|
| Acrylic Acid | 79-10-7 | 1–3 |
| 1-Acetyl-2-Phenylhydrazine | 114-83-0 | 0.1–1 |
| Cumene Hydroperoxide* | 80-15-9 | 0.1–1 |
| Saccharin | 81-07-2 | 0.1–2 |
| Adhesion Promoter Additive[1] | — | 0.5–1.5 |

[1]Chartwell 545.1 adhesion promoter

The examples set forth above serve to illustrate the present invention, but in no way are intended to limit the spirit and scope thereof, which is defined by the following claims.

What is claimed is:

1. An anaerobic adhesive composition, reaction products of which demonstrate bond strengths of at least about 75% of their 24 hour room temperature bond strength within the first hour of room temperature cure, comprising:
    a.) an anaerobically curable (meth)acrylate monomer;
    b.) a cure system for said (meth)acrylate monomer; and
    c.) an adhesion promoter additive having the formula HO—[M]—R, wherein M comprises a metal or bimetal complex and R comprises a methacryl group.

2. An anaerobic adhesive composition comprising the reaction products of:
    a.) an anaerobically curable (meth)acrylate monomer;
    b.) a cure system for said (meth)acrylate monomer; and
    c.) an adhesion promoter additive having the formula HO—[M]—R, wherein M comprises a metal or bimetal complex and R comprises a methacryl group; and
    wherein the bond strength after 1 hour room temperature cure is about twice the strength as compared to components a.) and b.) in the absence of component c.).

3. An anaerobic adhesive composition, the reaction products of which demonstrate bond strengths of at least about 75% of their room temperature bond strength within the first hour of room temperature cure, comprising:
    a.) a (meth)acrylate ester present in amounts of at least about 30% by weight;
    b.) methacrylic acid in amounts of at least about 10% by weight;
    c.) tert-butyl-peroxybenzoate in amount of at least about 1% by weight;
    d.) saccharin in amounts of at least about 0.1% by weight; and
    e.) an organometallo adhesion promoter additive present in amounts of at least about 0.5% by weight.

4. An anaerobic adhesive composition, reaction products of which subsequent to 24 hour room temperature cure demonstrate at least a 10% increase in bond strength greater than the 24 hour room temperature bond strength, comprising:
    a.) an anaerobically curable (meth)acrylate monomer;
    b.) a cure system for said (meth)acrylate monomer; and
    c.) an adhesion promoter additive having the formula HO—[M]—R, wherein M comprises a metal or bimetal complex and R comprises a methacryl group.

5. A method of increasing the percentage and value of bond strength within the first hour of room temperature cure, an anaerobic adhesive composition comprising the step of adding to an anaerobic adhesive composition about 0.5–1.5% of an organometallo adhesive promoter additive having the formula OH—[M]—R, wherein M comprises a metal or bimetal complex and R comprises a methacryl group.

6. A method of preparing an anaerobic adhesive which reaches at least about 75% of its 24 hour room temperature bond strength within the first hour of room temperature cure comprising the steps of combining in admixture:
 a.) an anaerobically curable (meth)acrylate monomer;
 b.) a cure system for said (meth)acrylate monomer; and
 c.) an adhesion promoter additive having the formula HO—[M]—R, wherein M comprises a metal or bimetal complex and R comprises a methacryl group.

7. An anaerobic adhesive composition reaction products of which demonstrate improved cure speed and bond strength on polymeric surfaces comprising:
 a.) an anaerobically curable (meth)acrylate monomer;
 b.) a cure system for said (meth)acrylate monomer; and
 c.) an adhesion promoter additive having the formula HO—[M]—R, wherein M comprises a metal or bimetal complex and R comprises a methacryl group.

* * * * *

UNITED STATES PATENT AND TRADEMARK OFFICE
CERTIFICATE OF CORRECTION

PATENT NO.   : 6,596,808 B1
DATED        : July 22, 2003
INVENTOR(S)  : F. Newberth, III et al.

It is certified that error appears in the above-identified patent and that said Letters Patent is hereby corrected as shown below:

Column 5,
Line 28, should read -- The polybutadiene and... --.

Column 7,
Line 54, should read -- ...variety of -OC(R2)O- anionic... --.

Signed and Sealed this

Ninth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,596,808 B1
DATED : July 22, 2003
INVENTOR(S) : Frederick F. Newberth, III, et al.

It is certified that error appears in the above-identified patent and that said Letters Patent is hereby corrected as shown below:

Column 5,
Line 28, change "ipolybutadiene" to -- polybutadiene --

Signed and Sealed this

Thirty-first Day of August, 2004

JON W. DUDAS
*Director of the United States Patent and Trademark Office*